United States Patent
Grieser

(10) Patent No.: US 6,980,900 B2
(45) Date of Patent: Dec. 27, 2005

(54) METHOD FOR DETERMINING AN ESTIMATE OF THE MASS OF A MOTOR VEHICLE

(75) Inventor: Joerg Grieser, Eberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 138 days.

(21) Appl. No.: 10/949,599

(22) Filed: Sep. 23, 2004

(65) Prior Publication Data

US 2005/0065695 A1 Mar. 24, 2005

(30) Foreign Application Priority Data

Sep. 24, 2003 (DE) .......................... 103 44 210

(51) Int. Cl.⁷ .......................... G06F 19/00; G06F 7/70; G06F 7/00; G06F 7/76
(52) U.S. Cl. .............................. 701/70; 701/71; 701/84; 701/96; 701/97; 701/107; 303/121; 303/167
(58) Field of Search .............................. 701/84, 96–97, 701/70–71, 80, 93, 107, 54, 87, 103; 303/121, 167; 180/179; 477/107, 115

(56) References Cited

U.S. PATENT DOCUMENTS

| | | | | |
|---|---|---|---|---|
| 4,679,866 A | * | 7/1987 | van Zanten et al. | 303/167 |
| 5,088,043 A | * | 2/1992 | Akishino et al. | 701/93 |
| 5,128,869 A | * | 7/1992 | Akishino et al. | 701/97 |
| 5,233,530 A | * | 8/1993 | Shimada et al. | 701/107 |
| 6,434,472 B1 | * | 8/2002 | Minowa et al. | 701/96 |
| 6,510,374 B1 | * | 1/2003 | Saotome et al. | 701/80 |
| 6,711,488 B2 | * | 3/2004 | Zierolf | 701/71 |
| 6,792,344 B2 | * | 9/2004 | Minowa et al. | 701/96 |
| 2001/0014845 A1 | * | 8/2001 | Minowa et al. | 701/84 |
| 2003/0020731 A1 | * | 1/2003 | Zierolf | 701/71 |
| 2004/0153233 A1 | * | 8/2004 | Minowa et al. | 701/96 |

FOREIGN PATENT DOCUMENTS

| | | |
|---|---|---|
| DE | 42 28 413 | 3/1994 |
| DE | 197 07 210 | 8/1998 |
| DE | 197 28 769 | 1/1999 |

* cited by examiner

*Primary Examiner*—Thomas G. Black
*Assistant Examiner*—McDieunel Marc
(74) *Attorney, Agent, or Firm*—Kenyon & Kenyon

(57) ABSTRACT

A method for determining an estimate of the mass of a motor vehicle for use in controlling the brake system of a motor vehicle, in which a driving force and a force of inertia acting instantaneously on the wheel being determined for all the wheels of the vehicle, and the instantaneous driving forces and inertia forces of all wheels as well as an instantaneous wind resistance of the motor vehicle are added up and divided by the instantaneous longitudinal acceleration of the vehicle to determine the estimate of the mass. In addition, the rolling resistance of the vehicle and/or a braking force acting instantaneously on the wheel is determined for all the wheels and taken into account in the addition.

9 Claims, 4 Drawing Sheets

METHOD FOR DETERMINING AN ESTIMATE OF THE MASS OF A MOTOR VEHICLE

FOREIGN PRIORITY APPLICATION INFORMATION

This application claims priority to and the benefit of German patent application no. 103 44 210.3, filed in Germany on Sep. 24, 2003. The entirety of the German priority application is hereby incorporated by reference.

1. Field of the Invention

The present invention relates to a method for determining an estimate of the mass of a motor vehicle for use in controlling a brake system of the motor vehicle.

2. Background Information

In controlling automotive brake systems, the most accurate possible estimate of the mass of the vehicle is desirable for several reasons. For example, the method for calculating the adhesion coefficient of the wheels currently used in the electronic stability program (ESP) assumes the mass of the vehicle to be a fixed and invariant value. This is admissible for passenger vehicles, where the maximum additional load may be regarded as relatively minor in relation to the total mass, so that the error in computation of the adhesion coefficient is relatively low, but in vehicles having a great mass variance, such as trucks or vans whose total mass in the loaded state may be almost double that in the unloaded state this assumption yields incorrect values because the wrong mass enters linearly into the computation of the adhesion coefficient which is in turn used as the basis for the setpoint value calculation for the antilock brake system (ABS), automatic traction control (ATC), and the vehicle controller.

In addition, motor vehicles which tend to overbrake the rear axle because of their braking force distribution and pitching tendency are equipped with mechanical or electronic braking force distributors which ensure that when braking, the rear-axle wheels are not overbraked and thus retain a sufficiently high lateral force so that the vehicle remains stable in the lane selected by the driver. In ESP, this function is implemented by the rear-axle control, which compares the slip of the rear-axle wheels with that of the front-axle wheels. If the slip of the rear-axle wheels is greater than that of the front-axle wheels and if there is a certain vehicle deceleration at the same time, the wheel brake pressure on the rear-axle wheels is maintained or reduced. It is then no longer possible to increase the pressure on the brakes of the rear-axle wheels despite greater operation of the brake pedal.

The driving performance of vehicles having a high load is very different in the loaded versus unloaded states. When not loaded, performance is extremely critical in terms of driving dynamics and quickly manifests a tendency to oversteering, but when loaded they generally perform well. If the rear-axle control activation threshold is based on the mass of the loaded vehicle, it will be difficult to control in terms of driving dynamics in the unloaded state and with this configuration it may even violate statutory provisions. However, if the rear-axle control activation threshold is based on the mass of the unloaded vehicle, it will be stable in this state but will be underbraked in the loaded state. The driver must implement his braking intent almost completely via the front-axle brake, which will then be subject to greater wear.

German patent document no. 197 28 769 (of the present applicant) discusses a method for determining the mass of a motor vehicle. In this method, an instantaneous driving force of the vehicle is determined at successive points in time, its instantaneous air resistance and the force for acceleration of rotating masses of the motor vehicle are determined from the moment of inertia of the wheels and these values are added up and the sum total thus formed is divided by the acceleration of the motor vehicle to obtain an estimate of its mass. An average is then formed from several estimates and subjected to a plausibility check for controlling a brake system of the motor vehicle. The known method is inaccurate, however, because non-negligible forces acting on the vehicle are not taken into account.

German patent document no. 42 28 413 (of the present applicant) also discusses another method for determining the vehicle mass, in which two longitudinal accelerations of the vehicle at different points in time are detected and the driving force of the vehicle prevailing at these points in time are determined so that the vehicle mass is determined from the difference between the driving force and the difference of the longitudinal accelerations.

German patent document no. 197 07 210 discusses another method for calculating the braking force distribution as a function of axle load, wherein the instantaneous axle load on one axle of the vehicle is determined via an axle load sensor when driving with and without braking, the axle load on the other axle being calculated by using the axle load determined in this way to determine correct absolute values for the braking forces on the two axles.

SUMMARY OF THE INVENTION

The exemplary method according to the present invention may have the advantage that a more precise estimate of the mass of the motor vehicle may be provided because additional forces acting on the vehicle are taken into account in determining the mass of the vehicle.

By this relatively accurate estimate of the instantaneous vehicle mass using the exemplary method according to the present invention, the adhesion coefficient of the vehicle may be corrected, which is used as the basis for the setpoint value calculation for the antilock brake system (ABS), the automatic traction control (ATC) and the vehicle controller, the correction factor being the quotient of the mass of the vehicle in the unloaded state and the estimate of the mass determined. By using a load-dependent adhesion coefficient, the setpoint value specification for ABS, ATC and vehicle controller may be better adapted to the instantaneous road surface conditions and thus the performance of the ESP may be increased significantly.

In addition, by using the estimate of the vehicle mass the rear-axle control activation threshold may be changed as a function of the load state of the vehicle, which allows for taking into account the different dynamic responses of the vehicle in the loaded versus unloaded state in the electronic braking force distribution. This provides for ensuring that the pressure limitation will ensure optimum driving stability and the greatest possible utilization of the rear-axle brakes in both loaded and unloaded states.

In an exemplary embodiment of the present invention, the instantaneous braking force component due to a lateral force resulting from a slippage is additionally determined on the wheels of a steering axle of the motor vehicle, all wheels being taken into account in the determination of the instantaneous driving forces and forces of inertia, so that estimates of the mass determined when negotiating a turn are more accurate.

In another exemplary embodiment of the present invention, the estimate of the mass is determined at short intervals by the ESP in an on-board computer of the motor vehicle; after correction and/or filtering of the estimate or an intermediate value obtained when calculating the estimate, the most recent estimate is used to control the brake system. For example, it is advantageous to filter the total of the instantaneous braking forces, driving forces and forces of inertia of all wheels plus the instantaneous wind resistance and rolling resistance of the vehicle and/or the estimate of the mass so determined to smooth the curve of these forces over time and eliminate transient disturbances. The filter used is a PT1 filter (first-order filter).

Since a slope and/or gradient of the road surface is interpreted as a greater or lesser mass in the force-acceleration equation which is used to determine the estimate of the mass, the instantaneous slope of the road surface is calculated in another exemplary embodiment of the present invention, again at short intervals, and the resulting estimate of the mass is corrected by taking into account the calculated slope and optionally a slope after filtering.

In many situations it may be impossible or at least impractical to determine a sufficiently accurate estimate of the mass because the system is in a non-steady state or the parameters used for the determination are too inaccurate, so the calculated estimate of the mass may be subjected to a plausibility check before being used to control the brake system of the motor vehicle, and this estimate of the mass is used only if it is classified as plausible. This check determines whether the vehicle is in a stable driving state, whether statements regarding the vehicle mass are allowed and/or whether there is any excessive transverse acceleration so that the sum of forces acting on the vehicle is not falsified due to compensation of the lateral force, for example.

A plurality of parameters which are different for different vehicles and different driving situations are included in an accurate estimation of the mass; therefore, according to another exemplary embodiment of the present invention, at least some of these parameters are to be determined in driving tests with the particular vehicle and stored in the on-board computer for access by the ESP system.

DETAILED DESCRIPTION

Figure 1:
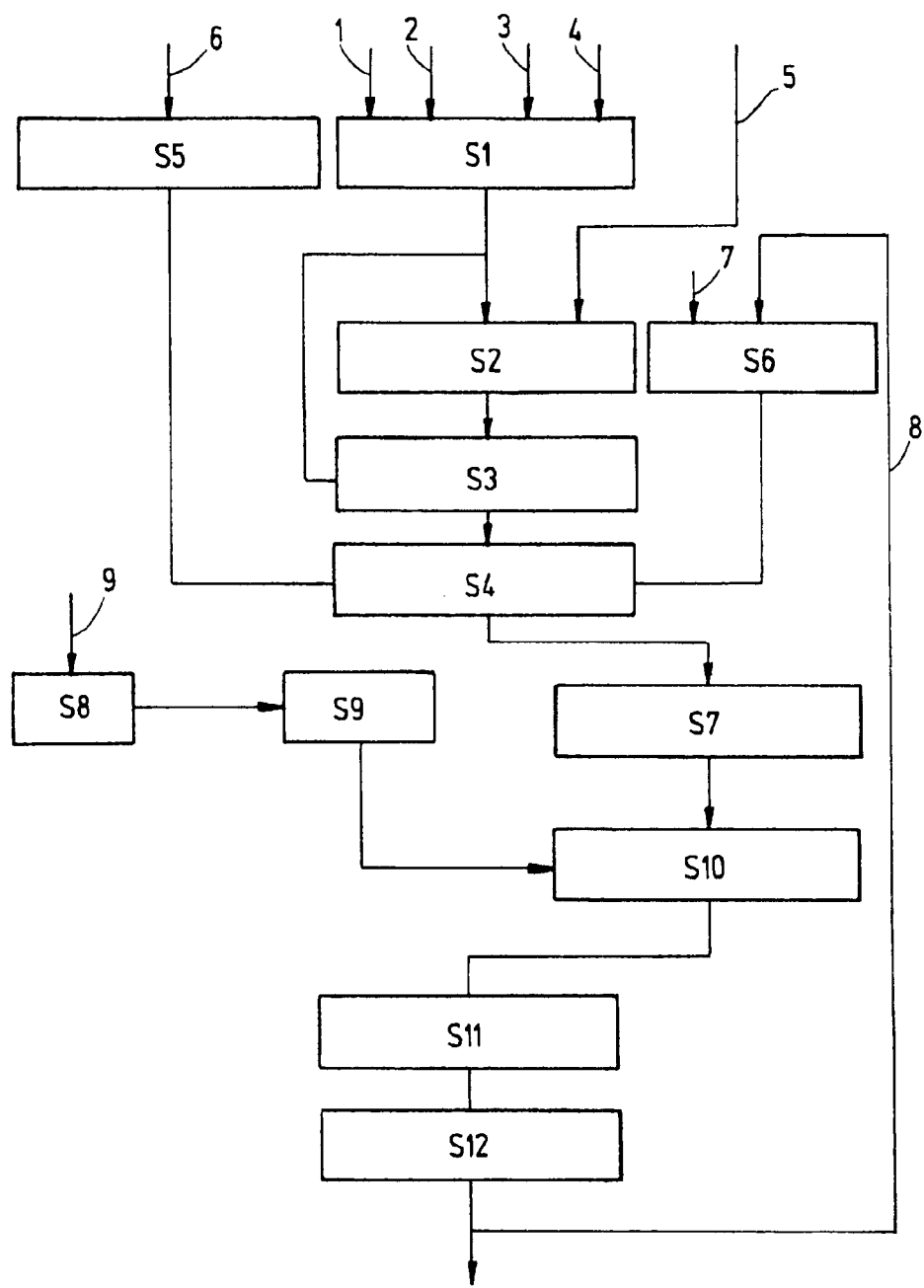
FIG. 1 shows a schematic flow chart of the exemplary method according to the present invention.

The flow chart in FIG. 1 shows an exemplary method of the present invention for determining an estimate of the mass of a motor vehicle. The estimate of the mass is determined at intervals of a few milliseconds by an Electronic Stability Program (ESP) stored in an on-board computer of the vehicle. The most recent value determined is used by the ESP system to control the brake system of the motor vehicle, being used in particular for correcting adhesion coefficient $\mu$ as a function of the load state of the vehicle and for improving its electronic braking force distribution, as explained in greater detail below.

To determine the estimate of the mass of the vehicle according to the method described below, a series of coefficients such as air resistance coefficient Cw, cycle time T of the ESP system, cross-sectional area A of the vehicle exposed to oncoming flow, wheel moment of inertia Jwheel, empty vehicle mass mFmMin, etc. are needed; these coefficients depend on the particular vehicle and are stored in a memory of the on-board computer for access by the ESP after being determined by driving tests, for example. In addition, a number of parameters such as steering angle Lw, wheel brake pressure pwheel, etc. are needed; these parameters depend on the particular driving state and are determined on an ongoing basis by appropriate sensors on the vehicle and queried on demand using the on-board computer.

In a first step S1, this method begins with cyclic determination of the instantaneous braking force, driving force, and force of inertia acting on each wheel of the motor vehicle during its operation and then adding up these coefficients according to the following equation to yield a wheel force Fbwheel:

$$Fbwheel = \frac{Cp * pwheel}{rwheel} + \frac{MkaHalb}{rwheel} + Jwheel * \frac{vwheel - vwheelK1}{rwheel^2 * T} \quad (1)$$

where Cp=ratio between the braking torque and the brake pressure, pwheel=wheel brake pressure, rwheel=wheel radius, MkaHalb=driving torque on the wheel, Jwheel= moment of inertia of the wheel, Vwheel=wheel velocity and VwheelK1=wheel velocity of the preceding cycle for determining the estimate of the mass.

The above-mentioned coefficients and parameters needed for calculation of wheel force Fbwheel are retrieved by ESP from the on-board computer and/or queried at the corresponding sensors of the vehicle, and, as indicated by arrows 1 through 4 in FIG. 1, supplied to a processor which performs the calculation in step S1. This is also similarly true of all coefficients and parameters given below which are used in the calculation of the estimate of the mass.

In a second step S2, the braking force component in the longitudinal direction of the vehicle is determined on each wheel of the front axle, i.e., the steering axle of the vehicle on the basis of an instantaneous lateral force due to a slippage because of a wheel deflection according to the following equation:

$$FbS = ((FbVL + FbVR) * \sin(Lw) * (l1 + l2) + FbVL * \cos(Lw) - FbVR * \quad (2)$$

$$\cos(Lw) + FbHL - FbHR) * 0,5 * SpW + JF * DvGiF + mF * l2 *$$

$$ayToF) * \frac{\sin(Lw)}{\cos(Lw) * (l1 + l2)}$$

where FbVL=wheel force left front wheel, FbVR=wheel force right front wheel, FbHL=wheel force left rear wheel, FbHR=wheel force right rear wheel, Lw=steering angle, l1=distance between the center of gravity of the vehicle and the front axle, l2=distance between the center of gravity of the vehicle and the rear axle, SpW=wheelbase of vehicle, JF=moment of inertia of vehicle about the vertical axis, DvGif=filtered yaw acceleration, ayToF=filtered transverse acceleration and mF=estimated mass from the previous cycle of the estimation of the mass.

As indicated by arrow 5 in FIG. 1, the required parameters such as steering angle Lw are queried by sensors and supplied to the processor.

This yields the following for the force on the front axle, taking into account the lateral force:

$$FbVA=(FbVL+FbVR)*\cos(Lw)+FbS1 \quad (3)$$

while the following is obtained for the force on the rear axle, where no lateral force need be taken into account:

$$FbHA=(FbHL+FbHR) \quad (4)$$

Finally, in a step S3, the following is obtained for the total force on the wheels:

$$Fbtot=FbVA+FbHA \quad (5)$$

In a step S4 instantaneous wind resistance FWind counteracting this total force on the wheels of the vehicle and instantaneous rolling resistance FRoll of the vehicle are added up, yielding a negative sign according to the opposite direction of the force vector according to the equation:

$$Ftot=Fbtot-FWind-FRoll \quad (6)$$

The wind resistance of the vehicle is first calculated according to the following equation in a step S5:

$$FWind=\tfrac{1}{2}*\rho Air*Cw*A*vFzRef^2 \quad (7)$$

where ρAir=density of the air, Cw=air resistance coefficient, A=cross-sectional area of the vehicle exposed to oncoming flow, vFzRef=vehicle velocity (arrow 6 in FIG. 1).

Rolling resistance FRoll of the vehicle is calculated as follows in a step S6:

$$FRoll=fRoll*mf \quad (8)$$

where fRoll=rolling resistance coefficient (arrow 7 in FIG. 1) and mf=estimated mass from the previous cycle of the estimation of the mass (arrow 8 in FIG. 1).

Rolling resistance coefficient fRoll is a function of velocity and may be described in first approximation as follows:

$$fRoll = PRollvMin + \frac{PRollvmax - PRollvMin}{vRollmax - vRollmin} * (vFzRef - vRollmin) \quad (9)$$

where PRollvMin=minimum rolling resistance at velocity vRollmin, PRollvmax=maximum rolling resistance at velocity vRollmax and vFzRef=vehicle velocity.

Figure 4:
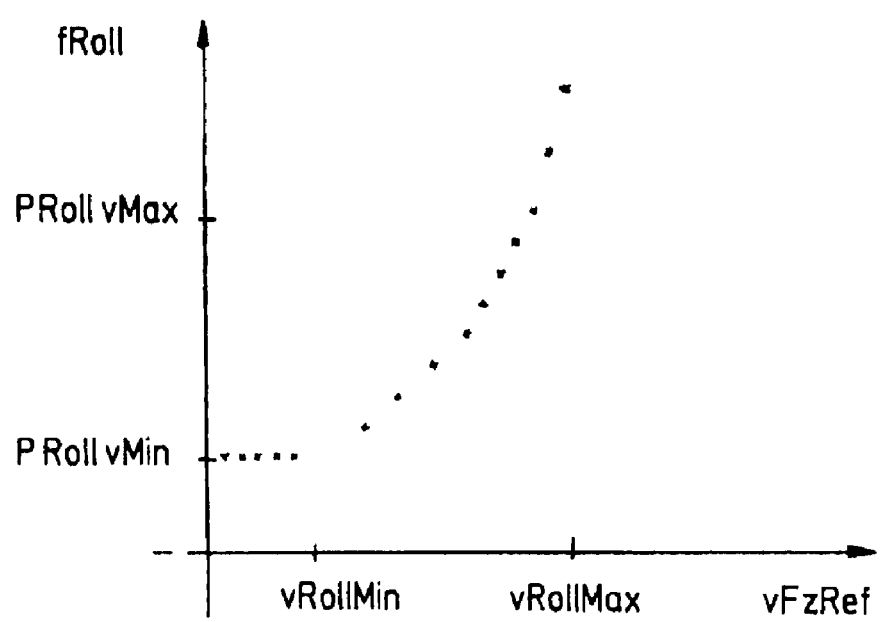
FIG. 4 shows a graph illustrating the rolling coefficient fRoll as a function of the vehicle velocity vFzRef.

For better understanding reference is made to FIG. 4 which shows a graph illustrating rolling resistance coefficient fRoll as a function of vehicle velocity vFzRef.

Total force Ftot from equation (6) is then filtered in a step S7 according to the equation:

$$FresF(t+1)=FrResF(t)+FilterFRes*(FbTot(t)-FresF(t)) \quad (10)$$

where FresF(t+1) and FresF(t)=filtered total force on the vehicle at times t+1 and t, respectively, t+1 corresponding to the momentary cycle, for example, t corresponding to the previous cycle, and FilterFRes=filter factor.

In filtering, the filtered variable is shifted toward a raw value, and transient interference is eliminated. For the estimated mass, the raw value is obtained as follows:

$$mFRaw = \frac{Ftot}{-ax} \quad (11)$$

A slope, i.e., a gradient in the road surface is also interpreted as mass in this force/acceleration equation. Although this error may be minimized in normal driving operation through suitable filtering of the calculated vehicle mass, the angle of slope α of the road surface must first be eliminated for lengthy uphill and/or downhill driving, because otherwise the wrong mass is used as the basis in controlling the brake system. This is performed in a step S10 according to the equation:

$$mFRawcorr=mFRaw*(1-\tan\alpha) \quad (12)$$

First in two steps S8 and S9, instantaneous angle of slope α of the road surface is determined. This may be accomplished, for example, when the vehicle is driving downhill and total force FTot acting on the vehicle is a braking force but the vehicle is accelerating. A raw value for angle of slope αRaw is then obtained in step S8 from the equation:

$$\tan(\alpha Raw) = \frac{axToOff}{9.81} * \frac{mF}{mFMin} \quad (13)$$

where axToOff=longitudinal acceleration offset (arrow 9 in FIG. 1), mFMin=empty vehicle mass and mF=estimated mass from the previous cycle of the estimation of the mass.

Accordingly a slope may also be recognized when the total force acting on the vehicle is a driving force or when there is a shifting operation but the vehicle is decelerating. The raw value of angle of slope αRaw of the road surface is then obtained again on the basis of equation (13).

In good approximation, angle of slope α is obtained in step S9 by filtering raw value αRaw.

$$\tan\alpha(t+1)=\tan\alpha(t)+\text{Filter tan}\alpha*(\tan\alpha Raw(t)-\tan\alpha(t)) \quad (14)$$

where tan α(t+1) and/or tan α(t)=filtered angle of slope at point in time t+1 or t, where t+1 corresponds to the momentary cycle and t corresponds to the previous cycle, for example, filter tan α=filter factor for filtering tan α.

Corrected raw value mFRawcorr from equation (12) is subjected to a plausibility check in a step S11 and is limited to plausible values which must lie in the following value range:

$$mFMin \leq mFRawcorr \leq (mFMax*1.05) \quad (15)$$

where mFMin=empty vehicle mass, mFMax=vehicle mass at maximum load.

In many driving situations, a calculation of vehicle mass may be impossible or may not be practical because the system is in a non-steady state or the variables used are too inaccurate. These situations are filtered out in step S11 in three stages using the following logic, assuming the following ranges as plausible:

1$^{st}$ Stage $$|FResF-FTot|<DeltaFResMax$$

and $$|FResF-FResFK1|<DeltaFResMax \quad (16)$$

where FResF=filtered total force on the vehicle, FResFK1= filtered total force on the vehicle of the preceding cycle, and DeltaFResMax is the limiting value for the dynamics of the signals used in order to rule out model errors from the simplified physical models.

If the above conditions are met, the system is in a steady state.

2$^{nd}$ Stage (pVor>pVorMin or MMotMe>MMotMeMin)

and

|aRes|>aResMin and

|FresF|>FResMin    (17)

where pvor=driver prepressure, pVorMin=minimum driver prepressure at which statements may be made regarding the acting braking forces, MMotMe=measured engine torque, MMotMeMin=minimum engine torque, aRes=resultant vehicle longitudinal acceleration, aResMin=resultant minimum vehicle longitudinal acceleration, FResF=filtered total force on the vehicle and FResMin=filtered minimum total force on the vehicle.

If the above conditions are met, significant variables are obtained.

3$^{rd}$ Stage

|ayToF|<ayToFMax    (18)

where ayToF=filtered transverse acceleration and ayToFMax=maximum value of the filtered transverse acceleration.

If this condition is met, the transverse acceleration is not excessively great, so the lateral force compensation does not result in a false total force FbTot on the wheels.

Corrected raw value of vehicle mass mFRawcorr, which has been evaluated as plausible, is then used in step S12 as the estimate of the vehicle mass for controlling the brake system after a final filtering of the vehicle mass against corrected raw value MFRawcorr.

Filtering in step S12 is performed according to the equation:

$$mF(t+1)=mF(t)+(mFRawcorr(t)-mF(t))*FiltermF \quad (19)$$

where mF(t+1) and/or mF(t)=estimate of the vehicle mass at point in time t+1 and t, respectively, where t+1 corresponds to the momentary cycle, for example, and t corresponds to the previous cycle and filter factor FiltermF is not a constant but instead is calculated as follows:

$$FiltermF = FiltermFMax - tmFplaus * \frac{FiltermFMax - FiltermFMin}{tmFplausMax} \quad (20)$$

where tmFplaus=a counter for an estimation of the mass considered to be plausible. The greater this counter, the smaller is the filter factor, i.e., the more intense is the filtering of corrected raw mass mFRawcorr. The very intense filtering precludes transient interference resulting in a wrong estimation of the mass.

If the vehicle is standing still it may be loaded and thus the mass will change. Standstill phases are measured and result in resetting of the plausibility counter after a certain period of time.

The final estimate of the vehicle mass from equation (19) is then used by the ESP for calculating and/or correcting the adhesion coefficient of the vehicle wheels, which is calculated in general as:

$$\mu = \frac{FbTot}{FN} \quad (21)$$

where FbTot=total braking force and FN=tire contact force.

Total braking force FbTot is the sum of the individual braking forces on the wheel:

$$FbTot=FbVL+FbVR+FbHL+FbHR \quad (22)$$

while the tire contact force is obtained from the product of the vehicle mass times the acceleration due to gravity:

$$FN=mF*9.81 \text{ m/s}^2 \quad (23)$$

The corrected adhesion coefficient calculated using the estimate of the mass from equation (19) is obtained as follows:

$$\mu corr = \mu * \frac{mFMin}{mF} = \frac{FbTot}{FN} * \frac{mFMin}{mF} = \frac{FbTot}{mF*9.81 \text{ m/s}^2} \quad (24)$$

This corrected value is used to form the setpoint value for the individual controller parts of the brake system such as the antilock brake system (ABS), automatic traction control (ATC) and vehicle controller.

Figure 2A:
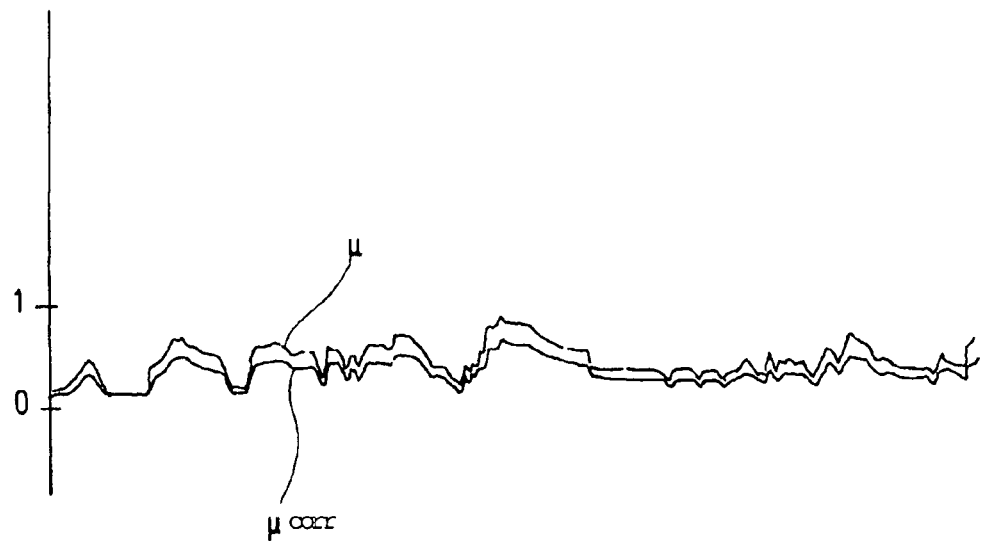
FIG. 2a shows a diagram of a coefficient of static friction of the motor vehicle determined by estimation of the mass with taking into account the loading of the motor vehicle.
Figure 2B:
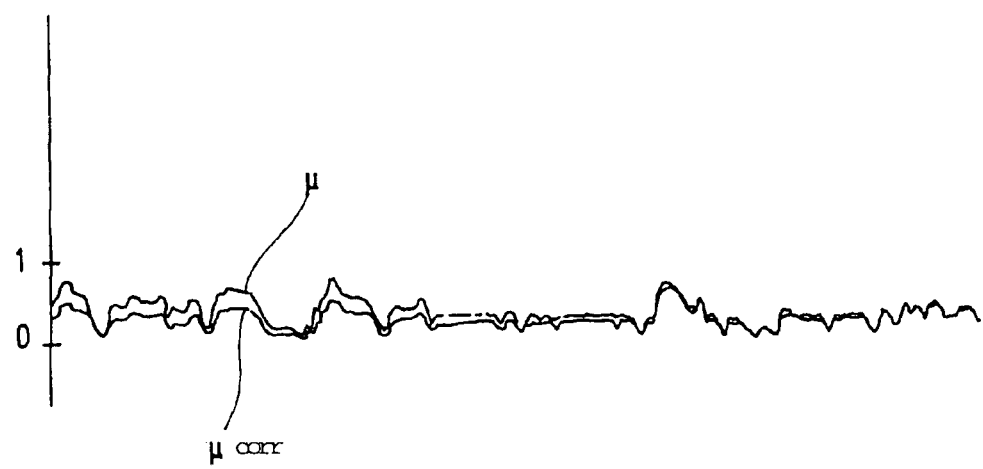
FIG. 2b shows a diagram of a coefficient of static friction of the motor vehicle determined by estimation of the mass without taking into account the loading of the motor vehicle.

FIGS. 2a and 2b show the corrected and uncorrected adhesion coefficients μcorr and μ, respectively, for a loaded vehicle (FIG. 2a) and an unloaded vehicle (FIG. 2b). It may be seen here that the corrected value is smaller than the uncorrected value, in particular for a loaded vehicle, and thus ensures greater driving safety.

In addition, the final estimate of the vehicle mass from equation (19) is used by the ESP for improving the electronic braking force distribution.

The threshold value for activating the rear-axle control is based on the final estimate of the mass of the most recent cycle. The following equation holds for the acceleration-dependent threshold value for starting the rear-axle control:

$$axHAB = axHABMin + \frac{axHABMax - axHABMin}{mFMax - mFMin} * (mF - mFMin) \quad (25)$$

where axRear-axle controlMin=minimum value of the threshold value and axRear-axle controlMax=maximum value of the threshold value. These values are determined on the empty vehicle and on the fully loaded vehicle from the standpoint of vehicle stability. For partially loaded vehicles, acceleration-dependent threshold value axRear-axle control varies within lower limit axRear-axle controlMin and upper limit axRear-axle controlMax depending on the estimated mass.

In addition, for activation of rear-axle control, at least one rear-axle wheel must be slipping in excess of a threshold value sIHAMinRear-axle control. This threshold value is obtained as follows:

$$sIHAMinHAB = \frac{P\_sIHAMinHAB}{fMax - mFMin} * (mF - mFMin) \quad (26)$$

Figure 3A:
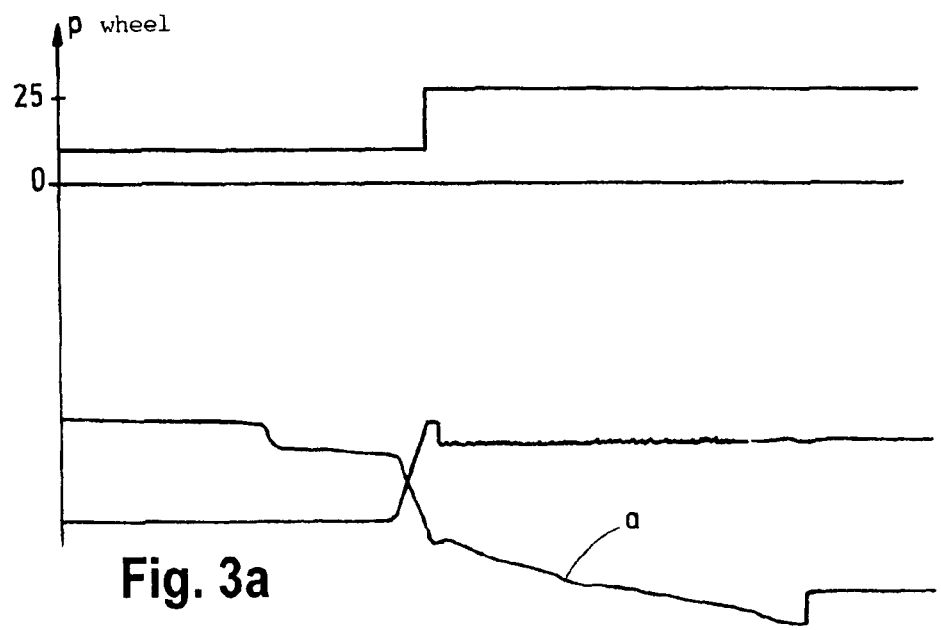
FIG. 3a shows a diagram of the brake pressure on the rear-axle wheels of a motor vehicle as well as the deceleration of the motor vehicle in braking, with taking into account the loading of the motor vehicle by estimation of the mass in setting the rear-axle control activation threshold.
Figure 3B:
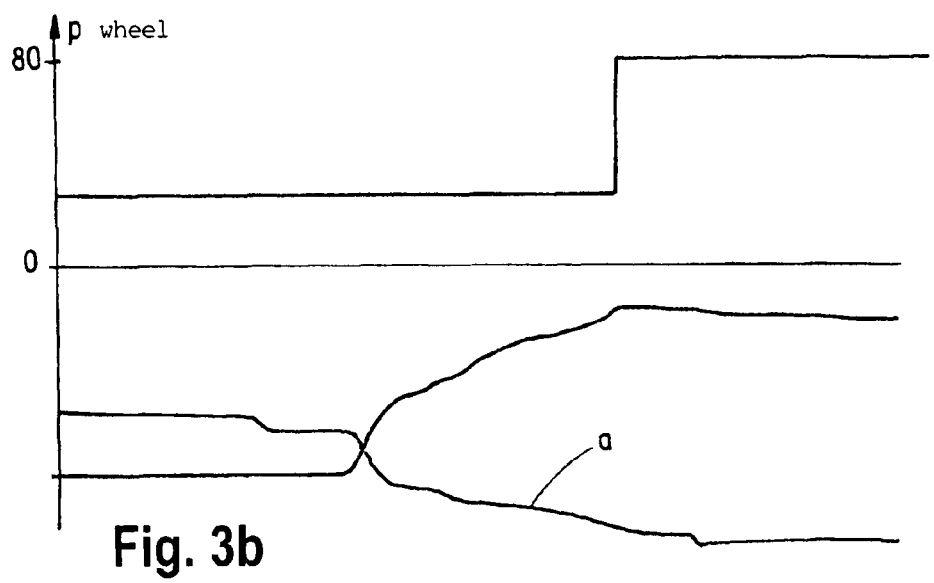
FIG. 3b shows a diagram of the brake pressure on the rear-axle wheels of a motor vehicle as well as the deceleration of the motor vehicle in braking, without taking into account the loading of the motor vehicle by estimation of the mass in setting the rear-axle control activation threshold.

FIGS. 3a and 3b show two diagrams of brake pressure pwheel on the rear-axle wheels of a motor vehicle as well as the deceleration of the motor vehicle without mass correction (FIG. 3a) and with mass correction (FIG. 3b) at a comparable declaration a. Although the brake pressure without mass correction amounts to approximately 25 bar, with mass correction it amounts to approximately 80 bar.

What is claimed is:

1. A method to determine an estimate of a mass of a motor vehicle for use in controlling a brake system of the motor vehicle, the method comprising:

determining a driving force and a force of inertia acting instantaneously on a wheel being determined for all wheels of the vehicle;

determining at least one of a rolling resistance of the motor vehicle and a braking force acting instantaneously on the wheel for all wheels of the motor vehicle; and adding up the instantaneous driving forces and the forces of inertia of all wheels plus an instantaneous wind resistance of the vehicle to provide a summation result, and dividing the summation result by an instantaneous longitudinal acceleration to determine the estimate of the mass, wherein the at least one of the rolling resistance of the motor vehicle and the braking force acting instantaneously on the wheel determined for all wheels of the motor vehicle are taken into account in the summation.

2. The method of claim 1, wherein an instantaneous braking force component due to a lateral force because of tire slip is determined for the wheels of a steering axle of the motor vehicle and is taken into account in determining the instantaneous driving forces and the forces of inertia of all the wheels.

3. The method of claim 1, wherein the summation of the instantaneous braking forces, the driving forces and the forces of inertia of all wheels as well as the instantaneous wind resistance and the rolling resistance of the vehicle is filtered to eliminate transient interference.

4. The method of claim 1, wherein the determined estimate of the mass is filtered to eliminate transient interference.

5. The method of claim 1, further comprising:

determining an instantaneous slope in the road surface; and correcting the resulting estimate of the mass taking into account the determined slope.

6. The method of claim 1, further comprising:

subjecting the determined estimate of the mass to a plausibility check, and only using the estimate for controlling the brake system of the motor vehicle if the estimate is classified as plausible.

7. The method of claim 1, wherein the estimate of the mass is determined at short intervals, and a most recently determined estimate is used to control the brake system after it is at least one of corrected and filtered.

8. The method of claim 1, wherein the estimate of the mass is used to determine a coefficient of static friction of the vehicle.

9. The method of claim 1, wherein the estimate of the mass is used to improve an electronic braking force distribution.

* * * * *